United States Patent [19]
McGuire et al.

[11] Patent Number: 6,123,016
[45] Date of Patent: Sep. 26, 2000

[54] APPARATUS FOR DEPOSITING A PLURALITY OF DISCRETE GLOBULES OF GELLABLE FRUIT

[75] Inventors: Denis McGuire; Edward Richard de Haan; Robert Hodge Clark, all of Abbotsford, Canada

[73] Assignee: Brookside Foods Ltd., Abbotsford, Canada

[21] Appl. No.: 09/441,922

[22] Filed: Nov. 17, 1999

Related U.S. Application Data

[63] Continuation of application No. 09/316,728, May 21, 1999, which is a continuation of application No. 08/949,040, Oct. 10, 1997, abandoned, which is a continuation of application No. 08/912,247, Aug. 15, 1997, abandoned.
[60] Provisional application No. 60/024,097, Aug. 16, 1996.
[51] Int. Cl.[7] .................................................. A23C 15/04
[52] U.S. Cl. .............................. 99/483; 99/537; 426/577; 426/573; 426/616
[58] Field of Search ...................................... 426/577, 573, 426/616, 654, 639, 640; 99/483, 537

[56] References Cited

U.S. PATENT DOCUMENTS

| | | |
|---|---|---|
| 3,647,478 | 3/1972 | Minor et al. . |
| 3,682,654 | 8/1972 | Johnson . |
| 3,737,328 | 6/1973 | Schumann . |
| 3,922,360 | 11/1975 | Sneath . |
| 3,994,215 | 11/1976 | Rabeler . |
| 4,117,172 | 9/1978 | Bradshaw et al. . |
| 4,126,704 | 11/1978 | McCarthy et al. . |
| 4,241,099 | 12/1980 | Tiemstra ................................ 426/577 |
| 4,251,547 | 2/1981 | Liggett . |
| 4,341,803 | 7/1982 | Koshida et al. ......................... 426/242 |
| 4,566,376 | 1/1986 | Webb . |
| 4,713,252 | 12/1987 | Ismail . |
| 4,767,630 | 8/1988 | Silver et al. ............................. 426/102 |
| 4,853,245 | 8/1989 | Bouillette et al. . |
| 4,859,481 | 8/1989 | Matsumura et al. ..................... 426/445 |
| 4,859,487 | 8/1989 | Matsumura et al. ..................... 426/639 |
| 5,084,296 | 1/1992 | Lugay et al. ............................. 426/573 |
| 5,190,758 | 3/1993 | Oelsner ................................... 426/577 |
| 5,417,990 | 5/1995 | Soedjak et al. . |
| 5,554,406 | 9/1996 | Muenz et al. ............................ 426/573 |

OTHER PUBLICATIONS

Richmond, Walter, "Choice Confections", pp. 308–319, Manufacturing Confectioner Publishing Company, Oak Park, Ill., 1954.

*Primary Examiner*—Nina Bhat
*Attorney, Agent, or Firm*—Oyen Wiggs Green & Mutala

[57] ABSTRACT

A non-liquid particulate fruit product which has a natural fruit flavor and which can be formed in desired configurations and sizes. The fruit ingredient can be derived from such fruits as blueberries, blackberries, strawberries, raspberries, etc. There is added to the fruit product pectin, liquid glucose, sodium citrate and sugar (e.g. sucrose). These ingredients are combined in a certain sequence. The mixture is brought to a boiling point to boil off a portion of the water. At a later time in the boiling of the mixture, a large portion of the sucrose is added to lower the temperature. The mixture is fed through a heating unit to raise the temperature of small quantities in the mixture very rapidly. Acid is added, and then the mixture is form in the desired shape, such as being dispensed as droplets onto a conveyor belt, where the droplets form into the particulate fruit product.

9 Claims, 5 Drawing Sheets

APPARATUS FOR DEPOSITING A PLURALITY OF DISCRETE GLOBULES OF GELLABLE FRUIT

This is a continuation of application Ser. No. 09/316,728, filed May 21, 1999, which was a continuation of application Ser. No. 08/949,040, filed Oct. 10, 1997, now abandoned which was a continuation of application Ser. No. 08/912,247, filed Aug. 15, 1997, now abandoned which was based on provisional application Ser. No. 60/024,097, filed Aug. 16, 1996.

BACKGROUND OF THE INVENTION (a) Field of the Invention

The present invention relates to a method of making a non-liquid fruit product which has a natural fruit flavor and which can be formed in desired configurations and sizes. More particularly, the present invention relates to particulate fruit product as a food product, where a substantial portion of the end product is derived from the fruit itself. The fruit chip product has a desirable balance of qualities of taste, texture, shelf life and other characteristics, giving a semblance or character of fresh fruit. The product by itself is a very tasty snack-like product, but it can also be incorporated advantageously in any number of other products, such as baked products, cookies, snacks, confectionery cereals, etc.

b. Background Art

There have been various methods disclosed in the prior art where natural fruit is used as an ingredient for a food product which has a fruit-like flavor or characteristics. A search of the prior art disclosed a number of these, and these are as follows:

U.S. Pat. No. 5,084,296 (Lugay et al) discloses a method of making simulated fruit pieces to be combined in breakfast cereals. The moisture content in breakfast cereals is generally about two percent to three percent, and when the particulate fruit product are mixed into the breakfast cereal and stored for a period of time (four to eight weeks), the fruit's moisture drops below ten percent. The process in this patent is to make the fruit piece so that the dry food product in the cereal/fruit mixture can maintain a moisture content as low as two percent, and yet the fruit pieces maintain a softness.

| | |
|---|---|
| Citrate acid | 0.3% to 1.0% |
| Sodium citrate | 0.1% to 0.4% |
| Glycerol | 15% to 30% |
| High Fructose solids or other sweetening compositions such as crystalline fructose | 5% to 35% |

The above weights are given as percentage of the total fruit piece.

Also separately from the liquid portion, the solid portion is prepared, this being the fruit solids and other optional ingredients, such as color, flavor, etc. The ratio of the fruit solids to liquid is approximately one to one, but could vary between 9.8 to 1 or 1.1 to 1.

The liquid portion is heated to temperatures of 60° to 100° C. and preferably 90° to 95°. Then the liquid and solid portions are mixed about one to four minutes. The mixture is then shaped, typically by running it through an extruder or a pasta machine to form into ropes or strands. The rope is permitted to cool and then is cut into pieces. Suitable non-sticking coating could be used.

U.S. Pat. No. 4,853,245 (Bouillette et al) shows a method of making a food product which is in the pieces or lumps of reconstructed fruit. Two different mixtures are placed in two storage tanks. In storage tank No. 1 there is basically a fruit concentrate, made up of a fruit puree, crystal sugar, an alcohol constituent (high percentage of alcohol), trisodic citrate and possibly citrate acid. The second tank contains sodium alginate, anhydrous dicalcic phosphate, crystal sugar and water. The mixtures from the two tanks are blended in a mixture and discharged, presumably into chunks or pieces which then harden to make the final product.

U.S. Pat. No. 4,117,172 (Bradshaw et al) describes a process for forming a fruit product which has an interior fluid or plastic simulates core and a relatively hard exterior shell. Thus, this simulates natural fruit products such as gooseberries, grapes, cherries, or black currants. First, a fruit pulp or puree is provided, and this forms 25% or more by weight of the total mixture.

An alginate sol is prepared by mixture of sodium alginate (1.5 parts), sugar (8.5 parts) and water (40 parts). The sodium alginate and sugar are mixed dry and water is added.

Then a puree mix was prepared (in this case a gooseberry puree) by providing:

| | |
|---|---|
| Gooseberry Puree | 35 parts |
| Sugar | 10 parts |
| Coloring and flavoring agents | 0.5 parts |
| Water | 4.5 parts |

The alginate sol gooseberry puree are mixed in equal proportions and then extruded into a trough containing a solution of the following:

| | |
|---|---|
| Calcium lactate penta-hydrate | 5 parts |
| Sugar (or the like) | 20 parts |
| Lactic acid | 1 part |
| Water | 74 parts |

The alginate sol and fruit mixture is extruded through apertures that open directly into the calcium lactate solution. On extrusion, a skin of calcium alginate is formed around each extruded piece. The pieces take a rounded shape similar to gooseberries, and are deposited on a conveyor belt which carries them through the trough. After ten minutes the pieces are removed from the calcium lactate solution, and there is an exterior surface that is thick and strong enough to withstand piling into a container. The pieces are then promptly put into an aqueous syrup. After standing for one half hour, the pieces are heated to 90° C. (steam kettle) in the aqueous syrup for a short period of time to prevent the core from becoming firm and these are then canned while still hot.

U.S. Pat. No. 3,922,360 (Sneath) discloses a process of making a simulated soft center fruit pieces, rather similar to the Bradshaw et al patent noted immediately above. Both of these are assigned to Lever Brothers Company of New York. In this patent,there is first provided a fruit pulp mix containing calcium iron. In the example given, this is as follows:

| Percentage by Weight | |
|---|---|
| Black Currant pulp | 41.1 |
| water | 42.8 |
| Calcium lactate | 1.1 |
| Citrate Acid | 0.2 |
| Sugar | 12.7 |
| Cross Linked Farina | 1.7 |
| Carboxymethyl cellulose | 0.5 |

As a separate ingredient, an alginate sol containing two percent by weight of sodium alginate was prepared.

There is shown an apparatus for forming this product where fruit puree droplets 10 are discharged through a center tube 2. There is a surrounding chamber 7 at the outlet end of the tube 2, and this chamber contains alginate so. A pneumatic pulsator is attached to a line 4 that communicates with the interior of the tube 2, and this causes drops of the fruit puree to drop off the end of the tube 2. Because of the surrounding alginate sol solution, a coating 11 surrounds the fruit puree droplet. This droplet 12 falls into the bath 10 which is a three percent by weight aqueous solution of calcium lactate. The drops remain in this bath for about five minutes and a firm exterior is formed, and the stickiness of the outer surface is eliminated. It is stated that when this particular product is canned in an aqueous syrup and sterilized at 130° C. for 30 minutes these simulated black currants formed had a texture remarkably similar to real cooked black currants. This also appears to be less relevant.

U.S. Pat. No. 3,682,654 (Johnson) relates to a process for forming artificial food pieces which simulate products having actual fruit therein. The overall method is described in column 1 of that patent, beginning on line 38, as follows:

"I have now discovered that artificial berries containing a liquid center can be simply prepared by merely encompassing an aqueous solution containing flavoring and a gel setting agent capable of causing an aqueous solution of hydrophilic colloid to set up by such a hydrophilic colloid solution. Since the interior of the berry does not contain the material capable of being set-up, the surface film or skin is formed from the inside out and the center or interior remains liquid. My invention thus provides unique artificial flavored berries which find use as additives to various foods including ice cream, cakes, pastries, muffins, pies, sauces, jams, candies and the like.

"In practicing my invention, two aqueous solutions are made. The first comprises water, flavoring and a gel setting agent capable to causing the hydrophilic colloid in the second solution to set up and form a skin around portions or droplets of the first solution. The second solution comprises water and a hydrophilic colloid capable of being setup by the gel setting agent."

An example is given in column 3 of the patent. The water in the first solution is at about 1215° F., while the water in the second solution is about 200° F. Individual droplets of the first solution are dropped into the second solution and allowed to remain in the second solution for about one/half to two minutes. The resulting artificial flavored berry product is then removed from the second solution. These have a continuous skin or encasement and a liquid center which remains as such for extended periods of storage.

Also, there are in the prior art various systems for forming an extruded food product. A search of the patent literature has disclosed the following:

U.S. Pat. No. 4,251,547 (Liggett) shows a means for forming a fishing bait from an alginate mix. The bait mix is exposed to a fluid that causes the alginate to form a skin on a droplet. In FIG. 4, the bait material is ejected by a pulsating pump into the solidifying so that ridges are formed. If the pump does not pulse a smooth sided article is formed.

U.S. Pat. No. 4,126,704 (McCarthy et al) shows a means for ejecting a food product from the valve structure shown in FIGS. 2 and 3, into a mold.

U.S. Pat. No. 3,737,328 (Schumann) shows a system in which a confection is dropped from holder 12, to a conveyor belt where it hardens. There is an oscillating wire structure on the bottom of 12, to form the material into droplets.

U.S. Pat. No. 3,647,478 (Minor et al) shows a means to form pellets of ice cream by extruding the material on to a conveyor belt. There are cutting wires 24, that oscillate to cut the material being extruded into required lengths.

SUMMARY OF THE INVENTION

The present invention relates to a method of making a non-liquid natural food product which has a natural fruit flavor with a desirable balance of qualities of taste, texture, shelf life and other characteristics, giving a semblance or character of fresh fruit. The method of the present invention enables this product to conveniently be formed in various configurations and sizes. One quite desirable application of the present invention is to form this product in the form of "chips" which can be eaten, but can also be incorporated advantageously in other food products, such as cookies, snack products, or possibly combined with other food products as a separate chip product.

In the method of the present invention, there is provided a natural food ingredient comprising fruit solids and water, with the water content being sufficiently high to enable pectin to disperse and hydrate in the fruit ingredient, and with pH of the fruit ingredient being sufficient high so that pectin in the fruit ingredient does not pre-gel.

Pectin is added to the fruit ingredient and mixed into the fruit ingredient. The temperature of the food ingredient is brought to a boiling temperature, and the fruit ingredient is boiled for a sufficient length of time to reduce the water content of the fruit ingredient.

Sugar is added to the fruit ingredient to form a fruit ingredient/sugar/pectin mixture. An acid ingredient is added to the mixture with the mixture at a sufficiently high temperature to delay the pectin in the mixture from gelling.

The mixture is then cooled to bring the mixture to a non-liquid state.

The fruit ingredient is selected from a group consisting of blueberries, blackberries, strawberries, raspberries, oranges, lemons, limes, cherries, mangoes, peaches, apricots, passion fruit, cranberries, apples, black currents, papayas, grapes and combinations thereof.

In a preferred form of the present invention prior to cooling the fruit ingredients/sugar/pectin mixture, the mixture is dispensed into a desired configuration or configurations while substantially maintaining the mixture at a sufficiently high temperature to delay the pectin in the mixture from gelling. One preferred form is to dispense the mixture in droplets to form chips.

The form of the fruit ingredient is selected from a group consisting of fresh fruit, fruit puree, refrigerator fruit, frozen fruit that has thawed, concentrates or dried fruit which has water added thereto to form said fruit ingredient, and combinations thereof. The fruit can be in a particulate or comminuted form.

A buffer may be added to the fruit ingredient prior to adding the pectin, in order to delay gelling of the pectin. A preferred form of adding the pectin is to pre-mix the pectin with particulate sugar and then adding the mixed pectin and particulate sugar to the fruit ingredient. In the preferred form, the particulate sugar comprises sucrose. Also, in the preferred form, the mixture of sugar and pectin is between two to one and six to one.

A portion of the sugar is desirably added to the fruit ingredient after pectin is added and after the fruit ingredient is brought to a boiling point, but prior to when boil the fruit ingredient is completed.

At least a portion of the sugar is sucrose. Further, at least a substantial portion of the sucrose is added to the fruit ingredient at a time so that the sucrose is not at a boiling temperature for a length of time to cause substantial breakdown of the sucrose, so that a substantial portion of the sucrose remains as an ingredient in the final fruit product. Also, in a preferred form, at least a portion of the sugar is a lower weight molecular sugar so that the final product comprises both sucrose and the lower molecular weight sugar. The lower molecular weight sugar in a preferred embodiment comprises dextrose.

With regard to percentages of the quantities of ingredients by weight the fruit ingredient is 20% to 40%, and the total sugar content is 40% to 75%. The portion of the sugar that is sucrose is desirably in a percentage range by weight of 35% to 50%, and the portion of the sugar that is glucose is by weight of 15% to 25% of the total weight.

The product of the present invention is a non-liquid natural fruit product made in accordance with the method of the present invention.

Other features of the present invention will become apparent from the following detailed description.

DESCRIPTION OF THE PREFERRED EMBODIMENTS (a) Introduction

The first step is the selection and initial processing of one or more naturally occurring fruit products to be used as an ingredient for the end product. These fruit products can be either fresh, refrigerated, frozen, concentrated or dried. Among the fruit products suitable for the present invention are the following: blueberries, blackberries, strawberries, raspberries, oranges, lemons, limes, cherries, mangos, peaches, apricots, passion fruit, cranberries, apples, black currents, papayas, and grapes. Possibly other fruits could be used.

In the event that a fruit with a thick skin, such as an orange, is used, usually the skin would be removed and the remaining portion of the fruit used. Also, if the fruit had a large pit, such as a peach, this also would be removed. However, with raspberries, where the seeds are rather small, the seeds may simply be included in the raspberry fruit product utilized in making the food product of the present invention.

It may also be possible to use dehydrated foods as the starting fruit product. In that case, the dehydrated food would have to be reconstituted (have water combined therewith) in order to be incorporated in the process of the present invention.

In general, these fruits would be provided in the form of a puree, either with the seeds removed or with the seeds left in. Alternatively, the whole fruit or fruit pieces could be run through a blender, commutated in some other manner, or otherwise processed to be in a particulate form.

(b) First Embodiment of the Present Invention

Figure 1:
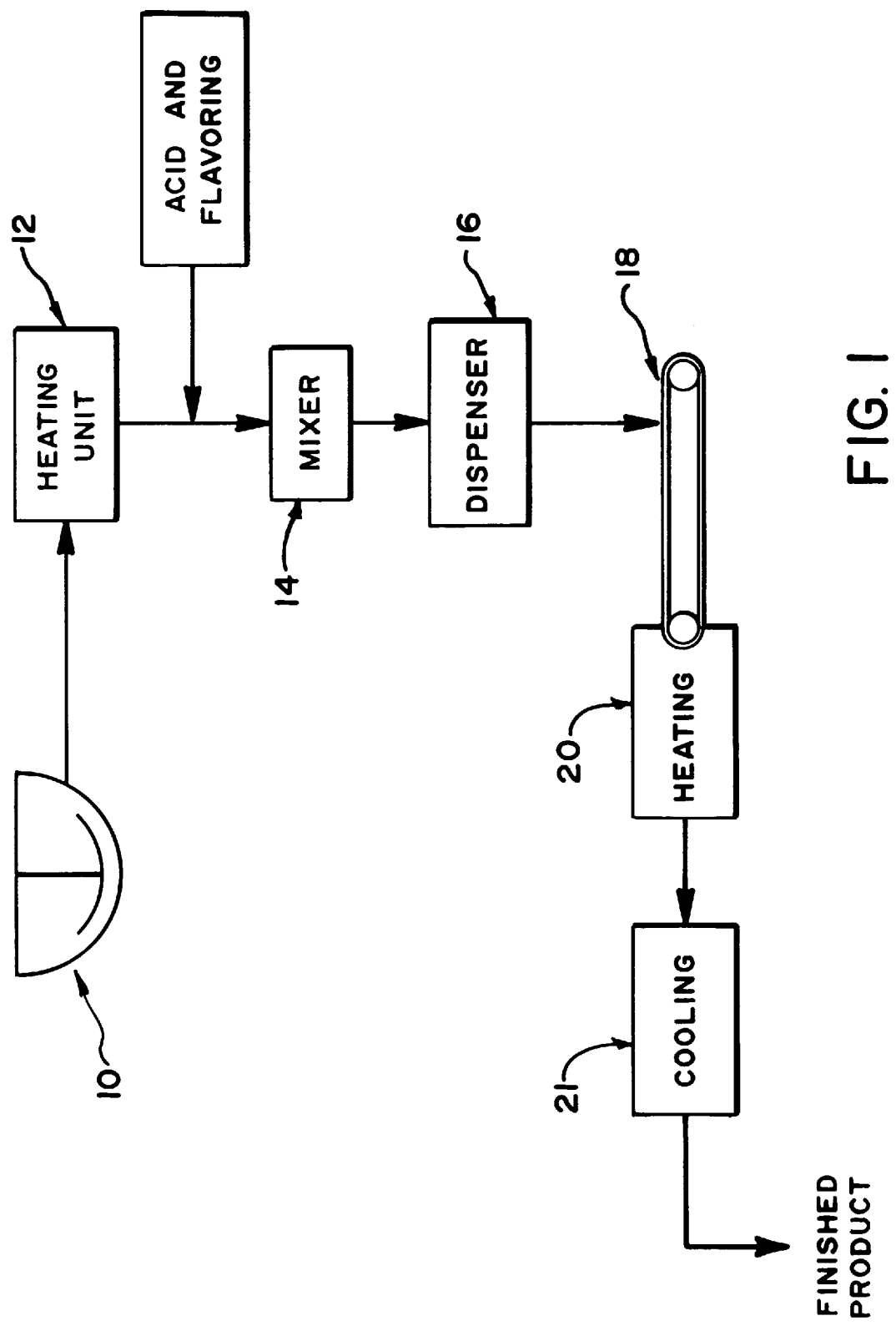
FIG. 1 is a schematic drawing of the apparatus utilized in a batch process of making the product of the present invention.

The first embodiment of the present invention is a bulk process or other process, and this is illustrated somewhat schematically in FIG. 1. First, the fruit product, as described above is mixed in a cooking kettle 10 having scrape surface mixing arms. There is added to the fruit product in the kettle pectin, liquid glucose, sodium citrate, and sugar (e.g. sucrose). These ingredients are combined in a certain sequence as will be described hereinafter.

The mixture in the kettle is brought to a boiling point and is maintained at that temperature in the kettle for about sixty to ninety minutes. The water in the mixture is gradually boiled off until the mixture is about 72% solids. Additional sugar is added to the batch to increase the total solids to 80–90%. Then this mixture either remains in the kettle and held in kettle at a temperature level at 160° F.–170° F.; or is moved to a storage tank and held at that temperature.

The liquid mixture in the kettle 10 or storage tank is then fed continuously through a heating unit 12 and this heating unit raises the temperature of small quantities of the mixture very rapidly to about 195° F. to 200° F.

As the mixture is discharged from the heating unit 12, both citric acid and natural flavoring are added. The flavoring (as its name implies) adds additional flavoring to the mixture. The citric acid is added to adjust the pH to give ideal conditions for the pectin to gel.

From the location where the citric acid and flavoring are added, the fruit mixture is directed through a mixer 14, and then to a dispensing apparatus 16, which itself is maintained at a temperature of about 195° F. The dispensing apparatus 16 directs the mixture into its dispensing chamber, from which the mixture is deposited as droplets onto a conveyor belt 18 to form chips. The conveyor belt carries the chips through a heating tunnel or chamber 20 and then through a cooling tunnel or chamber 21. Thus the chips are formed into a solid food product.

After being formed into chips, these can be coated with a small amount of oil when the chips are in the heating chamber 20. This is commonly done in the food industry to form protective layer on the outside of the product. For example, this would be done with dried fruits, raisins, etc. Or possibly another such sealing treatment could be used.

With the overall batch process being described, there will now be a further discussion of the details of the various steps in this process.

In describing this first embodiment, to place this in a practical framework, it will be assumed that a single batch of the fruit product is being made so that the final fruit product totals about 1,000 kilograms, and it will be assumed that the fruit product used is a raspberry puree. The total weight of the ingredients is about 1200 kilos, and with about 200 kilos of the water being boiled off, the end product will weigh about 1,000 kilos.

The cooking kettle which is used has a total containing volume equal to that which would hold about 1500 kilos of water. This kettle may be a commercial kettle such as the one made by Groen. This particular kettle has a variable speed mixer, and mixing elements scrape the sides of the kettle. There are baffles within the chamber to contribute to the mixing action. This is a steam jacketed kettle and is thus capable of boiling the ingredients contained therein.

Initially, in the cooking process, the fruit ingredients, as described above, is at about ninety percent water content when it is placed in the kettle (or at a minimum eighty percent water).

In this specific description of the first embodiment, we will assume that 360 kilos of the raspberry puree is placed in the kettle 10.) Most often the fruit ingredient will be mildly acidic, so before the pectin is added to the fruit ingredient in the kettle, a buffer is added to the fruit ingredient to raise the pH and delay the gelling action of the pectin. A preferred buffer is sodium citrate. However, other buffers could be used, such as sodium lactate, potassium phosphate, calcium tartrate, calcium citrate, etc. Since citric acid is used in the final stages of the process to provide the ideal conditions for the pectin to gel, sodium citrate would be compatible with the citric acid. It is to be understood, however, if the fruit ingredient is already at a sufficiently high pH then a buffer may not be needed.

After the buffer is added to the fruit ingredient and mixed therein, then the pectin is added. In this particular embodiment where 360 kilos of the fruit puree (specifically raspberry puree) are placed in the kettle, the amount of pectin would be approximately 24 kilos, the preferred method adding the pectin to the fruit ingredient is to mix the pectin, which is in powder form, with granular sucrose (which is part of the total sugar ingredient) and then add the mixture of sucrose and pectin to the fruit ingredient and mix it in. The sucrose enhances the ability of the pectin to disperse throughout the fruit ingredient. It is been found that mixing the sucrose with the pectin in about a four to one ratio (in this instance 80 kilos of sucrose to 20 kilos of pectin) is quite suitable.

The pectin is a high methoxy pectin. However, within the broader scope of the present invention, other types of pectin could be used.

A ratio of the water to the total solids of 4 to 1 would be a preferred ratio. However, a water to total solids ratio of 3 to 1 has also been found to work satisfactorily. In this particular example, where there is used 360 kilos of the fruit ingredient, and with the fruit ingredient being about nine parts water to one part solid, there would be about 36 kilos of fruit sugar and fiber and about 324 kilos of water. Then if we add 100 kilos of the sucrose/pectin mix, that would be 80 kilos of sucrose, 20 kilos of pectin and 36 kilos of fruit sugar and fiber which would make 132 kilos of total solids content. That would make the ratio a little bit less than a 3 to 1.

At this point, it should be noted that the sucrose which has initially been added as part of the sucrose/pectin mix is only a portion (i.e. about 25%) of the entire quantity of sucrose which is to be added, and the rest of the sucrose (about 75%) is added at a later time.

With the pectin being dispersed throughout the fruit ingredient in the kettle, and with the kettle having been heated by the steam in the jacket surrounding the kettle, the temperature of the fruit ingredient (with the pectin and a certain amount of the sucrose dispersed therein) begins to rise. The mixture in the kettle is brought to the boiling point of water, and at this temperature pectin hydrates. As indicated previously, for the pectin to properly disperse and hydrate in the mixture, it is necessary for there to be a rather high percentage of water. Therefore, at this point, whether the pectin dispersed and hydrated, it is possible now to add other solids to the mixture. The reason for adding the glucose only after the mixture has reached the boiling point is so that the total solids content of the mixture is not at such a high percentage as to impede the hydration of the pectin.

Shortly after the mixture is brought to the boiling point, then additional sugar is added. In the preferred form, this is added in the form of glucose. The glucose contains dextrose, and can also contain other ingredients such as maltose and dextrin. Various types of glucose can be used and the composition of the glucose is commonly varied by changing the percentage of the dextrose. The glucose is in a liquid form and is added to the mixture at the time (or shortly after the time) the mixture reaches the boiling point. This glucose (along with the sucrose which was initially added with the pectin) is of a sufficient quantity to prevent the fruit ingredient from burning during the cooking (boiling) during which water evaporates from the mixture. During this time the pectin does not bring the mixture to a gel where the mixture actually sets up. This occurs toward the latter part of the process.

With the glucose having been added, the mixture is maintained at a cooking temperature until the water content of the entire mixture is brought down to twenty five percent (seventy five percent dissolved solids). As the solids content increases, as indicated above, the boiling point increases, and toward the end of the cooking cycle, the boiling point is about 220° F.

At this point the remaining part of the sucrose (about 75% of the total) is added. In our specific example which we are following in the description of the first embodiment, this would about 440 kilos of sucrose. This raises the solid content of the mixture to about 82%.

At this point, the significance of using the two types of sugar (and also the sequence of adding the sugar) will be discussed. First, there is the liquid sugar (glucose) which has a lower molecular weight, and then there is the higher molecular weight sugar, which is a crystal solid, such as sucrose.

It is desirable to have a reasonably high percentage of sucrose as the sugar ingredient in the end product, since it better enables the product to "set up". If the only sugar present at 80% solids is sucrose, the sugar will crystallize out of the finished product. Using glucose as part of the sugar system keeps the sucrose from crystallizing out. The desired ratio of sugar should be about 65 percent sucrose and about 35 percent glucose, but this could vary between a one to one ratio to a three to one ratio.

If the sucrose remains at an elevated temperature for too long of a period of time, it will break down into other sugar components, and thus it's ability to enable the end product to properly set up is lost. The amount of sucrose which is initially added to the mixture by being mixed with the pectin is subjected to prolonged boiling and breaks down substantially into the other components. However, with the greater part of the sucrose being added at very end of the boiling period, this addition of sucrose immediately drops the temperature of the mixture to a sufficiently low level where the sucrose does not break down quickly.

With the sucrose being added, then the mixture is kept in the kettle, with its temperature being maintained at about 165° F. Alternatively, the mixture can be moved to a storage container, where it is maintained at 165° F., so that the kettle could be reused for a subsequent batch.

The next step is to direct the mixture from the storage tank through the heating unit 12.

Since a single batch of this mixture may weigh as much as 1,000 kilograms, it may take about two hours for this quantity of mixture to move through the heating unit 12. Thus a portion of the mixture will remain in the kettle or the tank at least about two hours. Since the temperature is only 16020 F. to 165° F. it is not cooking.

When the mixture from the kettle or the storage tank is pumped through the heating unit 12, the temperature of the mixture is raised very quickly to about 195° F. or 197° F. This heater 12 can be a prior art heater which is generally called a "thermutator". The function of the thermutator is to create very rapid heat transfer to bring all of the material in the thermutator up to a high temperature very quickly. This is accomplished by distributing the material in very thin layers so that the heat can move through the mixture very rapidly, and the material (i.e mixture) on the surface is constantly being scraped away. In one form, the material is passed through a cylindrical pipe, and there are scrapers which keep scraping the material off the interior of the pipe.

As the mixture is leaving the thermutator, the citric acid and the additional flavoring are added, and after this the mixture is immediately directed into the mixer 14. In the mixer 14 the temperature is still maintained at 195° F. so that the pectin does not start to gel. The mixture leaving the mixer 14 is then directed into the dispensing apparatus 16. As indicated previously, the dispensing apparatus 16 is encased and maintained at a temperature of about 195° F.

After a quantity of the mixture is raised up to about 195° F. in the heater 12, the timing within which the mixture is formed into the shape of the final product and cooled is critical. The conditions which make sucrose break down are time, temperature, and acid content. Therefore with the additional sucrose now being added (and with this sucrose desirably remaining in its present form as sucrose), this mixture with the added sucrose should not stay at a high temperature, with acid being added to the mixture, for a long period of time.

Also, the temperature and the timing of forming the product into its final form subsequent to the adding of the citric acid is critical. When the citric acid is added to the mixture, the mixture is at least at 190° F., and it is maintained at that temperature in the dispensing apparatus until the mixture is actually deposited onto a conveyor belt as droplets, or otherwise placed in its final form.

In this specific embodiment described herein, when the droplets of the mixture that are discharged from the dispenser 16 land on a conveyor belt 18, These droplets form into chips which are flat on the bottom and have a rounded, upper surface (a rounded, symmetrical dome shape that is somewhat flattened on the top). Then these very quickly solidify into a cohesive chip.

With a very short period of time (two to four minutes) after the droplets are deposited on the belt, to form as chips, the chips are directed into a heating zone 20 where the temperature is maintained at about 125° F. The chips travel through this heating zone for about ten minutes. As the chips are leaving the heating chamber, a spray of oil in the form of a very light mist is deposited onto the chips. As indicated previously, this is commonly done in the food industry to form a protective layer on the outsize of the product.

The chips leaving the heating chamber are then deposited onto a conveyor and carried for about 10 to 15 minutes through the cooling tunnel 22 in which the temperature is about 40F. Then the chips are stored at room temperature.

It has been found that by maintaining the particulate fruit product at a somewhat higher temperature (i.e. 125° F.) in the heating zone 20 for a period of time after the droplets are dispensed from the dispenser, the quality of the product is enhanced. It is believed that this permits the molecules within the chips to be more mobile for a certain period of time and better enable the pectin to properly permeate through this structure and bind in the water to a greater degree. Thus, it makes the structure of the end product more stable and more cohesive.

The end product, in the form of particulate fruit product, is stable for a relatively long period of time. The chips when packaged together do not stick together. The taste and texture of the chips is such that it has a desirable fruit flavor and sufficient "moistness" in the taste to make it an overall quite delectable product.

A typical formulation of the ingredients which are introduced into the mixture to make the end product would be as follows:

| Ingredients | Range Added Percentage | Ingredients (by weight) | Percentage Medium |
| --- | --- | --- | --- |
| Fruit | 20–40 | 350 Kg | 35 |
| Sugar (sucrose) | 35–50 | 380 Kg | 42 |
| Glucose | 15–25 | 210 Kg | 21 |
| Pectin | 1.2–2.0 | 16 Kg | 1.5 |
| Sodium Citrate | 0.2–0.4 | 3 Kg | 0.3 |
| Natural Flavor | 0.0–1.0 | 2 Kg | 0.2 |

(c) Second Embodiment

Figure 2:
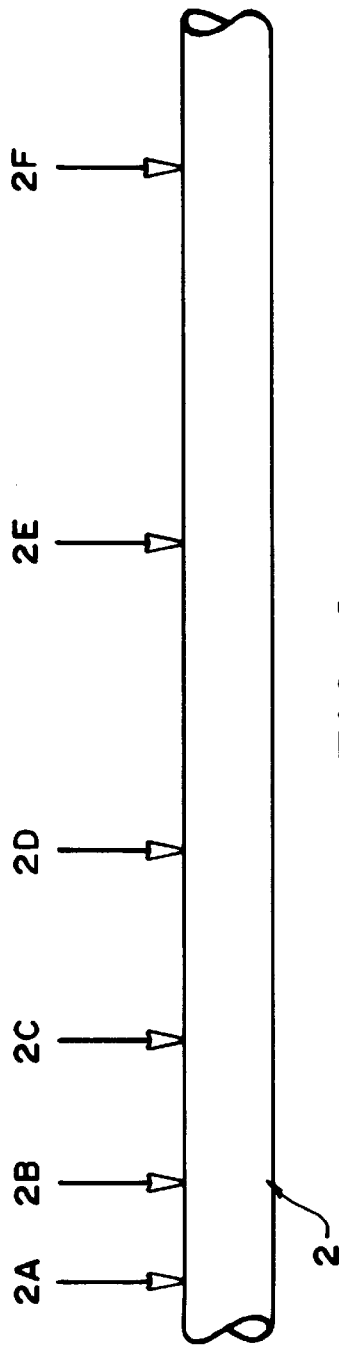
FIG. 2 is a schematic drawing illustrating a continuous process in making a food product of is the present invention.

The second embodiment of the present invention will now be described with reference to FIG. 2 which shows the process rather schematically. This is a continuous process which could be accomplished with continuous cooking in the form of an elongate tube, having a screw conveyor within the tube to move the material through the cooking chamber. This could be a double tube cooking apparatus where there is an outer annular chamber having a heating medium therein. Alteratively, this could be a triple concentric tube where there is an outer annular chamber and an innermost chamber, both of which have a heat exchange medium therein, and the material flows through the inner annular chamber. Thus, the screw conveyor would wipe both the inner and outer walls of the inner annular chamber.

There are several ports along the length of the cooking chamber through which the ingredients can be injected. Also, there would be exit ports for evacuation of moisture.

As shown herein, the elongate cooking tube 22 has six inlet ports designated 22a through 22f. The fruit ingredient is introduced into the continuous cooker 22 at the location 22a, and a short distance downstream, the buffer (sodium citrate) is introduced at 22b. A further short distance downstream, the pectin (mixed with the powdered sucrose) is introduced through the port 22c.

From the port 22c to the port 22d, there is a distance which is sufficient to enable the temperature of the mixture to be brought up to the boiling point so that the pectin is properly hydrated in the mixture. The glucose is then introduced at the location 22d. Then there is sufficient distance between the inlet ports 22d and 22e to enable sufficient heat transfer so that the water content of the mixture is reduced to the desired level by boiling the water away.

When this has been substantially completed, then the rest of the sucrose is introduced through the inlet port 22e, and this lowers the temperature of the mixture. The distance from the port 22e to the inlet port 22f is sufficient to enable the mixture to be brought up to the desired temperature (e.g. 190° F. to 195° F.), and the citric acid plus flavor (as needed) is introduced into the mixture at the inlet port 22f. Shortly after this, the mixture is directed from the outlet end of the cooking tube 22 and delivered to the dispensing apparatus.

The entire process time (the time for which a portion of the fruit ingredient is introduced into the inlet end until it is discharged to the dispensing apparatus) could take a total of about one and one half minutes. Accordingly, certain modifications could be made in this continuous process which would be different than the steps followed in the batch process. For example, in view of the fact that the boiling off of the water could occur in a rather short time, it may be possible to add the sucrose at the same location where the glucose is added (the inlet port 22d), with the cooking time possibly being short enough so that the sucrose would not break down to any great extent.

The ingredients could be preheated before being directed into the continuous cooker, or could be heated as quickly as possible after being directed into the continuous cooker. As indicated above, with regard to the adding of the sucrose (or similar sugar with a high melting point), depending upon how quickly the cooking is accomplished, the sucrose may be added at a more upstream location.

(d) The Dispensing Apparatus

As indicated earlier in this text, after the citric acid is added to the mixture, it is necessary to maintain the mixture at a high temperature 190° F. to 195° F. to delay the gelling action of the pectin. Therefore, the mixture must be moved through the dispensing apparatus so that the dwell time (the entire time that any portion of the mix remains in the dispensing apparatus) is sufficiently short, and so that the flow through the dispensing apparatus is sufficiently uniform that none of the mixture "stagnates" within the dispensing apparatus (i.e. does not end up in a "dead spot" where it is out of the flow through the dispenser). Also, there are other requirements. For example, on the assumption that the mixture is to be dispensed as droplets in a high production basis, there is the concern of obtaining uniform size and configuration in the droplets dispensed. Also, it is desirable that the droplets should be dispensed in a manner that the chips that are formed have a substantially uniform rounded surface on the upper side.

The dispensing apparatus of the present invention will now be described with reference to FIGS. 3 through 8A–C.

Figure 3:
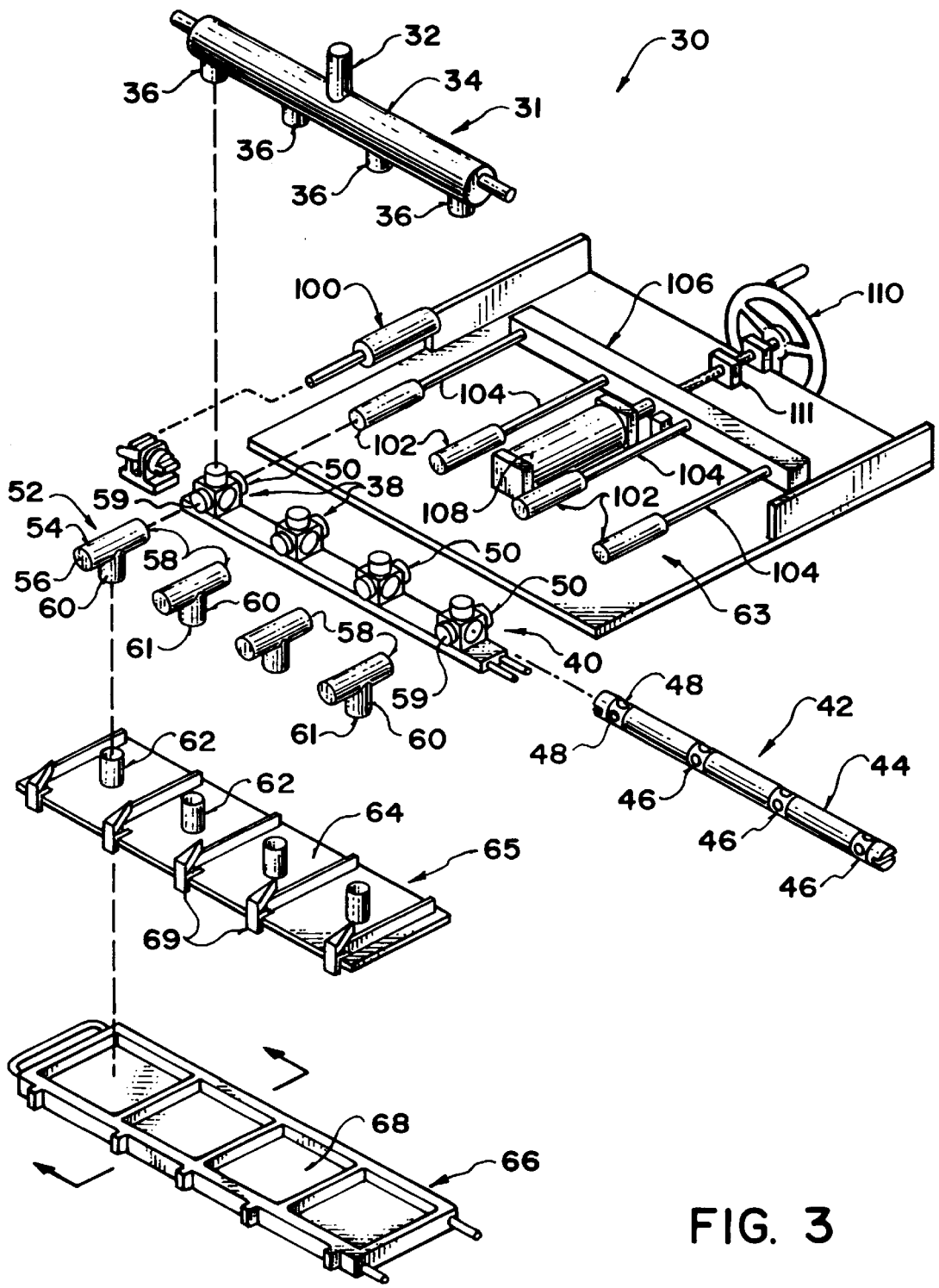
FIG. 3 is an exploded isometric view of a dispensing apparatus of in the present invention.

With reference to FIG. 3, the apparatus 30 comprises a manifold 31 which has an inlet conduit 32 and a dispensing manifold tube 34. There are four manifold outlets 36 positioned at evenly spaced locations along the manifold tube 34.

The four outlets 36 connect to four related valve housings 38 which are part of an overall valve assembly 40. There is a common valve element 42 which comprises a rod 44 and four valve spool components 46 positioned along the rod 24 so as to be located each within a related valve housing 38. Each valve spool component 46 has passageways leading therethrough (to be described later). The aforementioned four manifold outlets 36 each connect to a related upper inlet conduit 50 in each of the valve housings 38.

There are four T shaped transfer tube elements 52. Each "T" comprises an upper lateral tube portion 54 having one end capped at 56. The opposite end 58 of the tube portion 54 is connected to an outlet opening 59 of a related valve housing 38. The flow through the several valve housings 40 is from the manifold outlets 36 through the upper openings 50, thence through the related opening 58 of the T shaped member 52, thence through the vertical leg 60 of the T shaped member 52 out an opening 61 at the lower end of the leg 60 of the T element 52, and into a related inlet stub 62.

The flow from the manifold 31 and through the valve assembly 40 is an intermittent flow which is controlled by a piston assembly 63, which will be described later herein.

Figure 5:
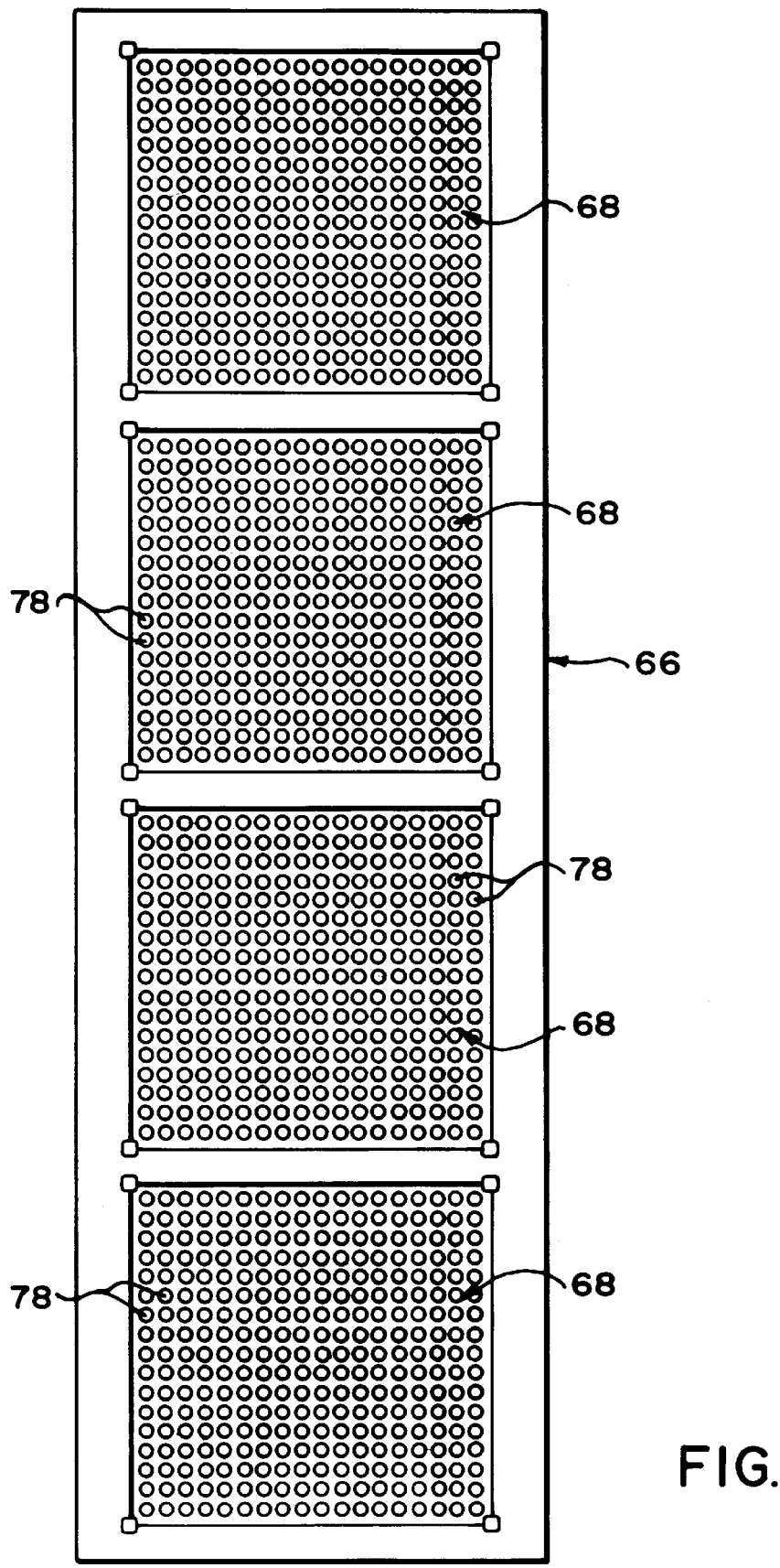
FIG. 5 is a top plan view of the bottom part of the droplet dispensing member.

The material flowing out of each lower leg opening 61 of the T element 52 feeds into a related inlet stub 62 positioned on a cover 64 of a droplet forming and dispensing plate assembly 65. This assembly 65 further comprises a lower plate-like member 66, which forms with the cover 64 four separate discharge chambers 68, each of which has a square configuration and is possibly 8 to 10 inches along each side. There are a number of clamping elements 69 that hold the cover 64 in firm engagement with the lower dispensing plate 66. FIG. 5 is a top plan view of the dispensing plate member 66, showing all four chambers 68 and discharge nozzles 78 arranged in grid pattern.

Figure 4:
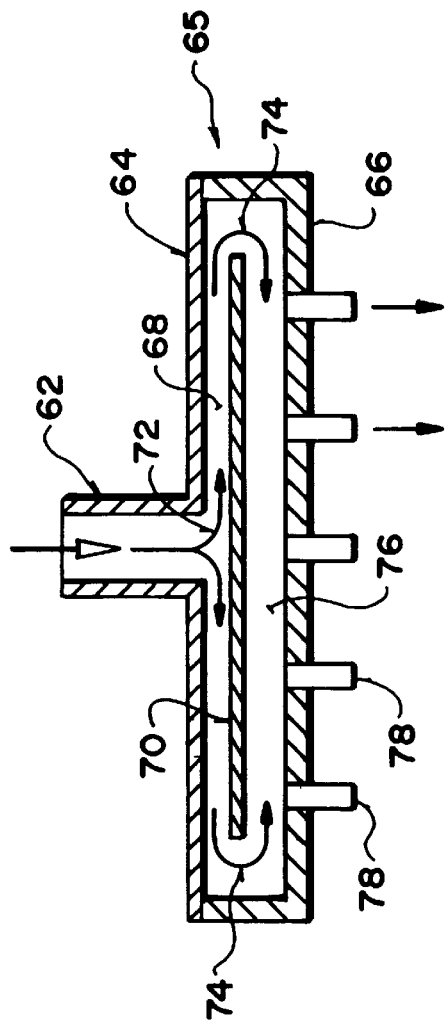
FIG. 4 is a somewhat schematic sectional view of a droplet discharge member of the dispensing apparatus shown in FIG. 3.

With reference to FIG. 4, which is a cross sectional view of one of the chambers 68 formed by cover 64 and lower dispensing plate 66, each of these chambers 68 has an internal horizontal deflecting plate 70 moderately above the mid-height of its chamber 68. The flow of the fluid fruit mixture is through the four stubs 62 into the top part of its related chamber, where it is deflected by the deflection plate 70 to flow radially outwardly from the stub 62 as indicated by the arrows 72, and thence around all of the perimeter edges of the plate 70 (indicated by the arrows 74 and then to flow radially inwardly into a lower dispensing area 76 of the related chamber 68 (which is adjustable to have some openings to allow some product to pass through holes and some deflected).

There are a gridwork of downwardly projections discharge nozzles 78 positioned at evenly spaced intervals across the bottom side of droplet discharge plate 66. (For convenience of illustration, only a few of the discharge nozzles 78 are shown schematically in FIG. 4, and a more realistic grid-like arrangement is shown in FIG. 5).

Figure 6:
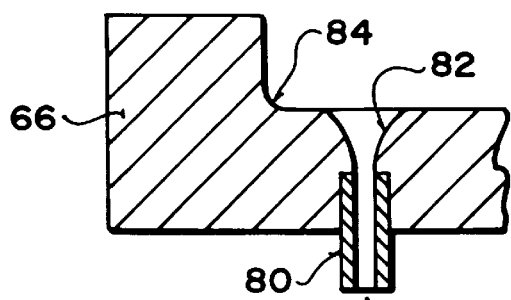
FIG. 6 is a sectional view showing the inlet tube of the dispensing assembly leading into a manifold of the dispensing assembly.

In FIG. 6 there is shown a typical cross section on one of the discharge nozzles 78 and also a perimeter portion of the dispensing plate 66. It can be seen that the nozzle 78 comprises a dispensing tube 80 which fits within an opening in a lower plate 66. The entry way 82 into the tube 80 is funnel shape to provide a downwardly converging passageway. Also, the inside corner perimeter edge portions 84 of the dispensing plate 66 are rounded so that there is a more uniform flow of the fluid fruit mixture, without dead spots. The other interior edges and corners of this entire dispensing assembly 65 are similarly rounded. This insures that there is a more uniform flow at all times so that no portion of the fruit mixture lingers in any part of the apparatus for any long period of time.

Figure 7:
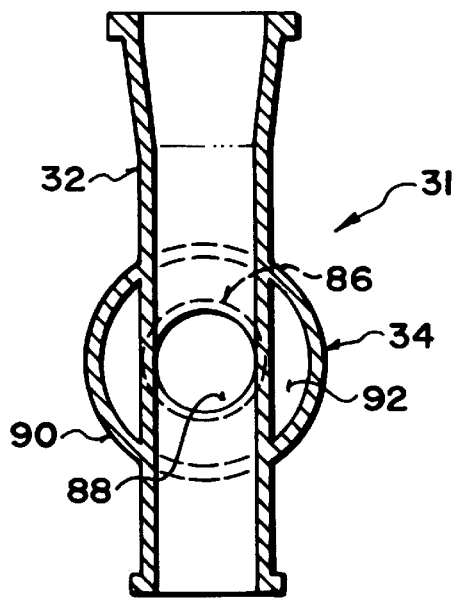
FIG. 7 is a sectional view showing only a peripheral portion of the dispensing member and a single discharge nozzle.

In FIG. 7, there is shown a cross sectional view of the manifold 31. There is the aforementioned inlet tube 32, and it can be seen that the aforementioned manifold dispensing tube 34 comprises an inner tubular member 86 defining a flow passageway 88 for the fruit mixture. The tube 86 is surrounded by an outer tube 90 which defines with the tube 86 an annular passageway 92 through which is directed hot water to keep the fruit mixture in the passageway 82 warm. In like manner, the other components of the dispensing apparatus 30 are similarly heated to maintain a temperature of 195° F.

Figure 8A:
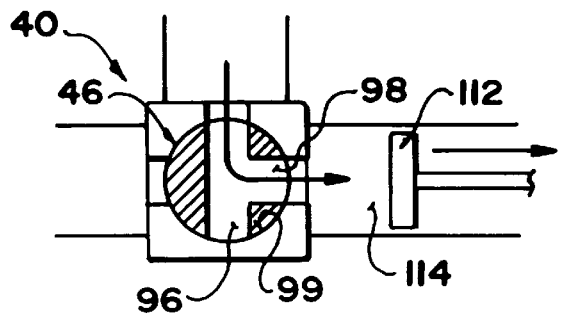
FIGS. 8A, 8B and 8C are semi-schematic drawings of one of the dispensing valves in the valve assembly, to show the mode of operation.
Figure 8B:
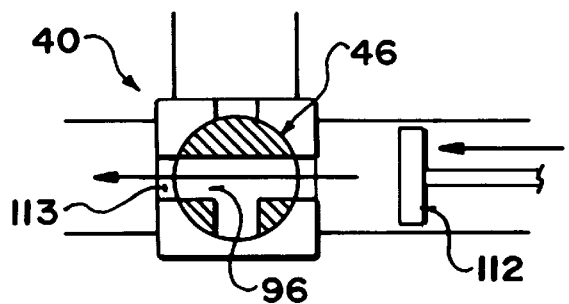
Figure 8C:
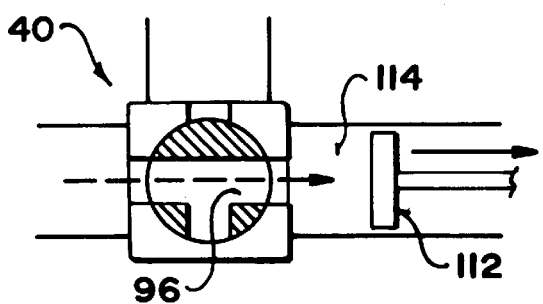

To describe the operation of the valve housing 38, reference is now made to FIG. 8A, 8B and 8C. These show schematically in section-view one of the valve elements 46. It can be seen that each valve element 46 has a through passageway 96 and a branch passageway 98. The valve housing has a circular interior opening to accommodate the valve spool component 46.

Attention is now again directed to the exploded drawing of FIG. 3, where there is shown the aforementioned piston assembly 63 which causes the intermittent droplet discharge of the fruit mixture. This piston assembly 63 comprises four cylinders 102, each containing a piston 112 and connected to one of four rods 104 that are in turn mounted to a common actuating bar 106. The bar 106 is driven by an actuating cylinder 108 which moves the bar 106 back and forth. There is an adjusting wheel 110 which moves a stop member 111 to limit the stroke of the actuator 108.

To describe the operation of this dispensing apparatus 30, reference is made back to FIGS. 8A, 8B, and 8C. In the position of FIG. 8A, all four pistons 112 of the piston assemblies 102 are being retracted to move the viscous fruit mixture (which is directed into the manifold assembly 31 under moderate pressure) downwardly through the passageways 96 which is now in the blocked position. Each piston 112 has a stroke just sufficient to draw in enough product fruit mixture to supply (on its discharge stroke) one set of discharge nozzles 78 with the proper amount of fruit material to form a number of fruit chip droplets in its related one of the four square chamber segments 68 of the dispensing assembly 65.

After the four pistons 112 have retracted the proper distance and drawn in the proper amount of fruit mixture, the valve elements 46 and part of valve rod 44 rotated 90° by drive piston 100 attached to drive component 101 to the position of FIG. 8B. As soon as this happens, the four pistons 112 are moved toward their related valves 46 to discharge the proper amount of the fruit mixture outwardly at 113 to flow through its related T member 52 into one of the four square dispensing chambers 68. Then the fruit material in each of the chambers 68 is moved through the dispensing nozzles 78 and onto the lower conveyor belt 18 (see FIG. 1).

Reference is now made to FIG. 8C which illustrates an advantageous feature of this dispensing apparatus. Just after the droplet of fruit material has been deposited onto the belt 18 in chip-sized droplets, each of the four pistons 112 is retracted a short distance. The reason for this is that when the droplets are discharged, there is left a string of the viscous fruit mixture material extending from the nozzle 78 down to the conveyor 16. By retracting the pistons 112 a short distance before the valve element 46 returns to the position of FIG. 8A, this draws some of the fruit mixture that is adjacent to the discharge tube a short distance back into the discharge nozzle 78 and breaks off this string. This permits the droplet to form more in the form of a discrete droplet without the "tail".

When this is accomplished, the valve elements 96 are moved back to the position of FIG. 8A, and the pistons 112 are further retracted to draw in a further charge of new fruit mixture into the chambers in which the pistons reciprocate so that another discharge stroke can be accomplished.

(e) Summary

It is evident that various modifications can be made to the present invention, without departing from the basic teachings thereof, and the following claims are intended to cover not only the compositions, methods, components, and functions described herein, but modifications and/or equivalents thereof.

What is claimed is:

1. An apparatus for depositing a plurality of discrete globules of gellible fluid fruit material on a surface comprising:

(a) a manifold with a fluid fruit mixture inlet and at least one fruit mixture outlet;

(b) at least one valve assembly connected to the fruit mixture outlet;

(c) at least one chamber connected to the valve assembly, said chamber having therein a plurality of fruit mixture deposition nozzles;

(d) a mechanism for drawing fluid fruit mixture into the manifold and forcing the fluid fruit mixture into the valve assembly; and (e) a mechanism for reciprocally moving the valve assembly from a position where a valve blocks flow of the fluid fruit mixture to a position where the valve permits the fluid fruit mixture to flow through the valve assembly into the chamber and out the plurality of fruit mixture deposition nozzles in the chambers.

2. An apparatus as claimed in claim 1 wherein there is a plurality of valve assemblies which comprise individual three-way valves.

3. An apparatus as claimed in claim 2 wherein the mechanism for drawing fruit fluid mixture into the manifold and forcing the fruit mixture into the plurality of valve assemblies is a plurality of pistons reciprocally mounted in cylinders.

4. An apparatus as claimed in claim 3 wherein the positions of the valve assemblies and the positions of the reciprocating pistons are synchronized so that when the pistons move in a direction which draws fluid fruit material into the valve assemblies, the valves are closed to the plurality of chambers, whereas when the plurality of pistons move in a direction which expels fluid fruit material from the plurality of piston assemblies, the valves are open to enable fluid fruit material to be transmitted to the plurality of chambers.

5. An apparatus as claimed in claim 1 wherein the deposition nozzles are arranged in a grid-like pattern.

6. An apparatus as claimed in claim 1 wherein the apparatus including the manifold is heated.

7. An apparatus as claimed in claim 6 wherein the manifold has a surrounding jacket which enables heating fluid to be circulated through the jacket.

8. An apparatus as claimed in claim 1 wherein the gellible fluid fruit mixture is deposited in the form of discrete globules onto a moving conveyor belt.

9. An apparatus as claimed in claim 1 wherein the chamber has a diversion baffle mounted therein.

* * * * *